April 23, 1957 W. L. SECORD, JR 2,789,733
VIBRATING FEEDER
Filed July 2, 1954 2 Sheets-Sheet 1
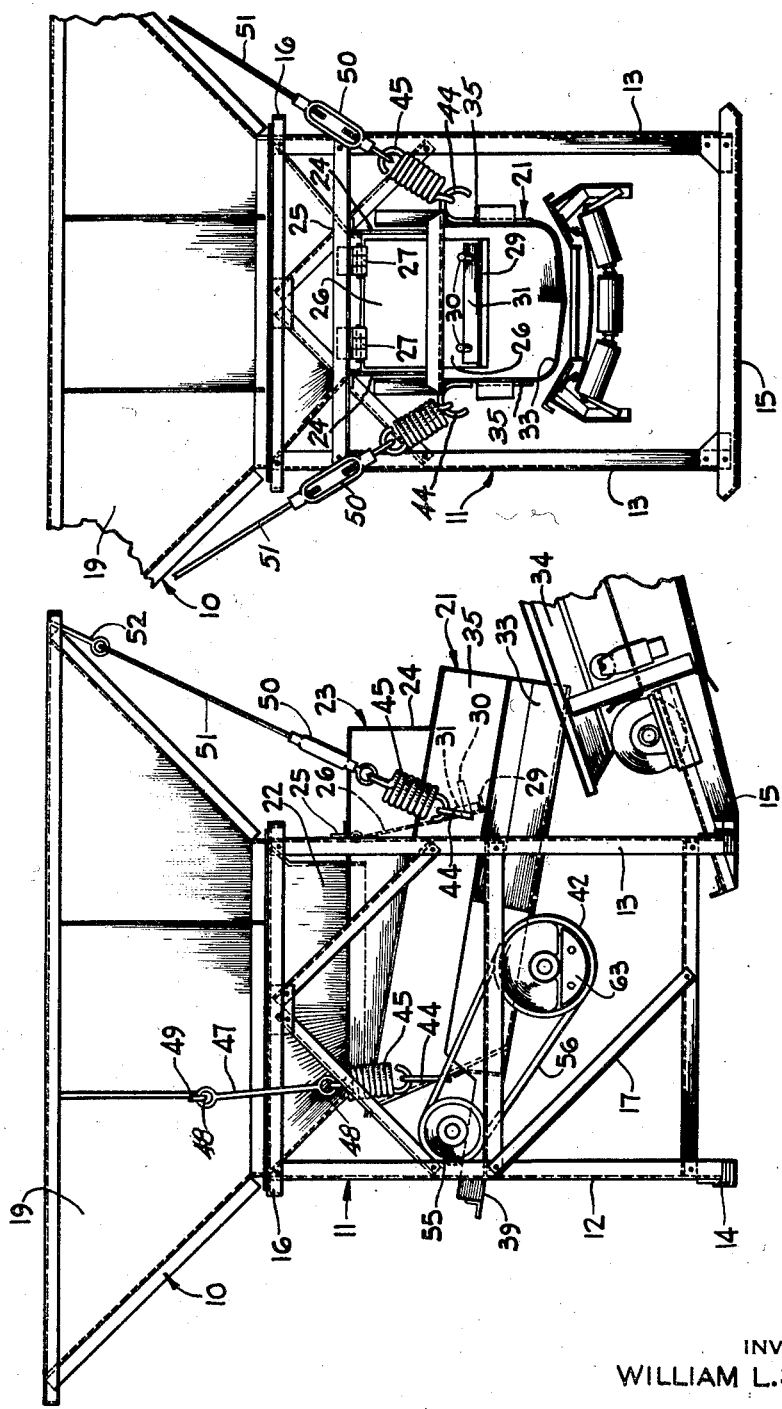
INVENTOR
WILLIAM L. SECORD, JR.
BY
ATTORNEY

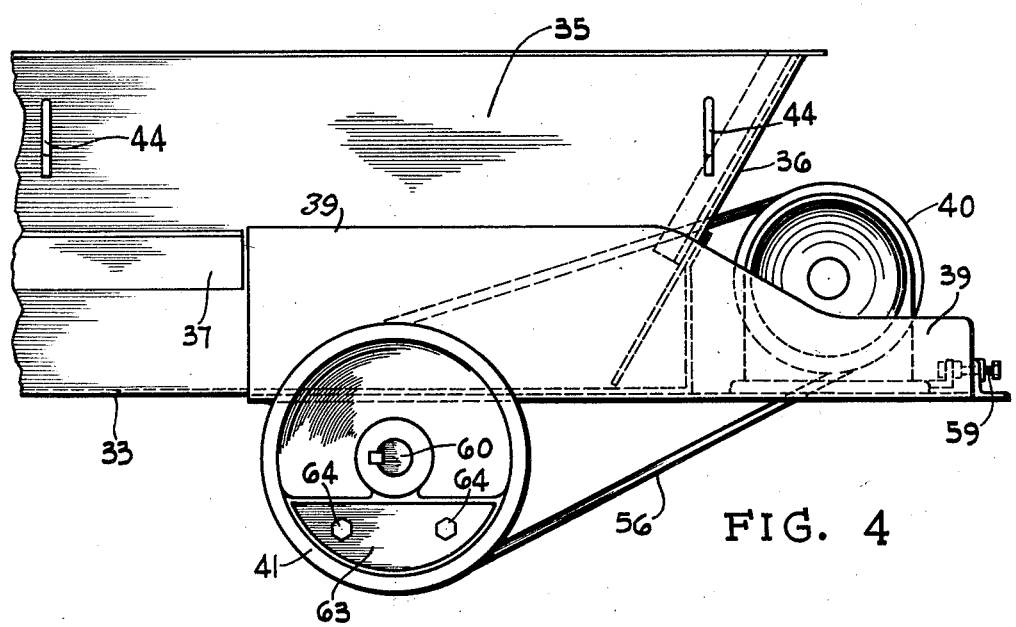
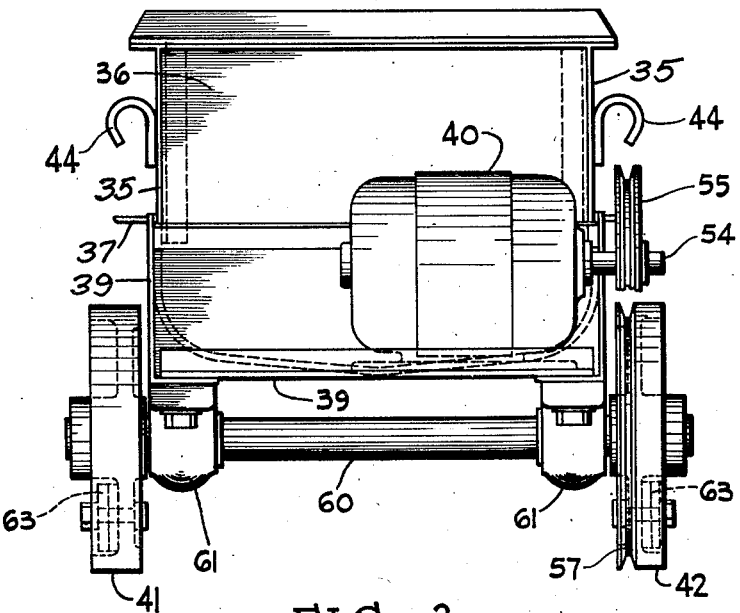

United States Patent Office 2,789,733
Patented Apr. 23, 1957

2,789,733
VIBRATING FEEDER

William L. Secord, Jr., Milwaukee, Wis.

Application July 2, 1954, Serial No. 440,897

4 Claims. (Cl. 222—185)

This invention relates to improvements in feeders for loose materials and more particularly relates to a vibratory feeder for feeding loose materials from a hopper.

A principal object of my invention is to provide a simplified form of self-contained freely suspended vibratory feeder which may be suspended in material receiving relation with respect to a hopper for feeding loose material therefrom at varying rates of flow as desired.

Another object of my invention is to provide a novel and improved form of vibratory feeder in which the rate of feed may readily be varied in a simple and expeditious manner.

Still another object of my invention is to provide a self-contained vibratory feeder adapted to be yieldably suspended in material receiving relation with respect to a hopper, in which the feeding action is attained by rotatably driven unbalanced flywheels carried by the feeder.

Still another object of my invention is to provide a vibratory feeder of a compact, self-contained construction in which a motor is mounted on the feeder and drives spaced flywheels extending along opposite sides of the feeder, and in which the amplitude of vibration of the feeder is varied by placing weights on or removing weights from the flywheels to unbalance the same as desired.

A further and more detailed object of my invention is to provide a self-contained feeder for feeding material from a bottom opening hopper in which the feeder is suspended from the hopper by springs and is vibrated by unbalanced flywheels extending along opposite sides thereof and driven by a motor on the feeder, and in which a door is provided for controlling the flow of material from the hopper to the feeder and the rate of flow of material from the hopper and the discharge rate of material from the feeder is varied by weighting the door as desired and by unbalancing the flywheels in varying amounts depending upon the required amplitude of vibration of feeder.

These and other objects of my invention will appear from time to time as the following specification proceeds and with reference to the accompanying drawings, wherein:

Figure 1 is a view in side elevation of a feeder constructed in accordance with my invention, showing the feeder suspended from a hopper and positioned in material discharge relation with respect to an elevating conveyor;

Figure 2 is a fragmentary front end view of the feeder shown in Figure 1;

Figure 3 is a rear end view of the feeder shown in Figure 1 with the drive pulley broken away in order to show certain details of the drive to the vibratory flywheels not shown in Figure 1; and Figure 4 is a fragmentary view in side elevation of the feeder, showing the front end portion of the feeder broken away.

In the embodiment of my invention illustrated in the drawings I have shown in Figures 1 and 2 a hopper 10 supported in spaced relation with respect to the ground on a support frame 11 having spaced rear and forward legs 12, 12 and 13, 13 respectively.

The legs 12, 12 and 13, 13 are shown as being tied together at their bottoms by skids in the form of upwardly facing angles 14 and 15 respectively, and as being tied together at their upper ends by a rectangular frame structure 16, which may be formed from connected angles. The legs 12, 12 and 13, 13 are also shown as being cross braced intermediate their ends by a suitable bracing structure indicated generally in Figure 1 by reference character 17.

The hopper 10 may be any well known form of hopper and as herein shown is in the general form of the frustum an inverted cone having sloping rectilinear side walls 19, 19 suitably connected together and converging at their lower ends to extend within the frame 11 for discharge into a vibrating feeder 21.

The hopper 10 has a discharge end portion 22 extending between the legs 12 and 13 within a chute 23 extending along each side of said discharge end portion. The chute 23 is shown in Figures 1 and 2 as comprising two vertically disposed plates 24, 24 closed at their rear ends and extending along each side of the discharge end portion 22 of the hopper 10 and beyond the forward ends of the legs 13, 13 and secured to and depending from a cross beam or angle 25. The cross beam or angle 25 is secured at its ends to the legs 13, 13 and is shown as having a gate 26 depending therefrom between the plates 24, 24 and piovtally connected to the cross beam 25 on hinge members 27, 27. The gate 26 is shown as having a right angled lip 29 extending forwardly from its lower end and as having laterally spaced pins 30, 30 spaced upwardly from the lip 29 and extending outwardly therefrom for receiving a weight 31 for varying the force required to open the gate 26 and thus vary the flow of loose material onto the feeder 21.

While I have shown only one weight 31 carried by the pins 30, 30, it should be understood that a plurality of weights 31 may be carried by said pins and that the greater the number of weights on the pins 30, 30 the greater will be the resistance to the flow of material from the hopper 10. The weights 31 may therefore be placed on or removed from the pins 30, 30 dependent upon the desired flow of material from the hopper 10 and chute 23 and the type or size of material in the hopper 10, so as to provide the required flow of material and avoid flooding of the feeder 21.

The feeder 21 is shown as comprising an inclined trough 33 having a discharge end arranged in cascade relation with respect to an elevating conveyor 34, herein shown as being a belt conveyor, for carrying the material from the feeder to a loading station. The trough 33 is shown in Figure 2 as being generally U-shaped in cross section with relatively high side walls 35, 35 extending upwardly along opposite side walls 24, 24 of the chute 23 and spaced outwardly therefrom. The side walls 35, 35 are shown as being connected together adjacent their rear ends by an inclined back wall 36 and as being reinforced intermediate their ends by stiffening angles 37, 37. The stiffening angles 37, 37 extend forwardly along the side walls 35, 35 from a support structure 39 secured to said trough and extending rearwardly therefrom. The rearwardly extending portion of the support structure 39 forms a base or platform for a motor 40 for driving spaced flywheels 41 and 42 extending along the sides of the trough 33, as will hereinafter more clearly appear as this specification proceeds.

The side walls 35, 35 are each shown as having spaced hooks 44, 44 extending outwardly therefrom, one being located adjacent the rear end of each side wall and the other being located intermediate the ends thereof. The hooks 44, 44 are shown as having tension springs 45, 45 hooked thereto, for suspending the feeder 21 from the hopper 19. As herein shown, a link 47 having eyes 48 at each of its ends is hooked to each rear tension spring at its lower end and is hooked at its upper end to hook 49 extending outwardly from a side wall 19 of the hopper 10.

The front tension springs 45 are each shown as having a turnbuckle 50 connected thereto and threaded on the end of a link 51, hooked at its upper end to an eye bolt 52 secured to and depending from the upper forward end portion of the hopper 10.

The turnbuckles 50, 50 are provided to adjust the trough 33 about both transverse and longitudinal axes to extend horizontally in a transverse plane and to vary the angle of inclination of the trough and thus vary the rate of feed of the feeder for varying types of materials for which the feeder may be used. It is of course obvious that the links 47 and 51 may be interchanged if desired for longer or shorter links to vary the angle of the trough 33 a greater extent than would be possible by mere adjustment of the turnbuckles 50, 50.

Referring now in particular to the means for vibrating the feeder trough 33, the base or platform 39 is of general channel-like form in cross section extending along the bottom of the rear end portion of the feeder trough 33 and beyond the rear end thereof and forming a platform on which the motor 40 is adjustably mounted. The motor 40 is shown as having a motor shaft 54 extending from one side of the platform 39 and as having a pulley 55 keyed or otherwise secured thereto and forming a drive member for the flywheel 42 through a flexible drive connection, herein shown as being a V-belt 56 engageable within a V-groove 57 extending around the flywheel 42 adjacent the inner margin thereof. A take-up means indicated generally by reference character 59 for adjustably moving the motor 40 along the platform 39 is provided to adjust the tension of the belt 56.

The flywheels 41 and 42 are keyed or otherwise secured to opposite ends of a transverse shaft 60 journaled inwardly of the flywheels 41 and 42 on bearing support members or pillow blocks 61, 61 secured to and depending from the bottom of the platform 39, adjacent opposite sides thereof.

Vibratory motion of the feeder trough 33 is attained by unbalancing the flywheels 41 and 42 by weights 63, 63 herein shown as being in the form of sectors of a circle bolted or otherwise secured to the respective flywheels as by nuts and bolts 64, 64. As shown in Figure 4, two weights 63 are bolted to each flywheel, but any desired number of weights may be bolted to each flywheel to increase or reduce the amplitude of vibration of the feeder trough 33 and the flow of material therealong.

It is, of course, understood that the greater the number of weights on the flywheels 41 and 42 the greater will be the amplitude of vibration of the vibratory trough 33 and thus the greater will be the flow of material along said trough to the discharge end thereof.

It may be seen from the foregoing that I have provided an extremely simple form of vibratory feeder for feeding material from a hopper onto a conveyor, or device to be loaded, and that vibratory motion of the feeder is attained by yieldably suspending the feeder and by rotatably journaling unbalanced flywheels thereon, driven by a motor supported on the feeder.

It may further be seen that the feeder may be readily adapted for various types of material and flow rates and that the rate of discharge of material from the feeder may be varied by varying the number of weights 31 on the gate 26, varying the angle of inclination of the feeder trough and by varying the amplitude of vibration of the feeder trough by varying the unbalanced conditions of the flywheels 41 and 42.

It will be understood that various modifications and variations of the present invention may be effected without departing from the spirit and scope of the novel concepts thereof.

I claim as my invention:

1. In a vibrating feeder, a support frame structure including a hopper, spaced legs supporting said hopper in spaced relation with respect to the ground, said hopper having a discharge portion in the space between said legs and having a chute extending therealong beyond the forward end thereof and opening to the front and bottom of said hopper, a gate pivoted between said chute at said discharge end portion of said hopper, a feeder trough extending beneath said chute at an angle with respect to the ground and upwardly along the sides thereof, a plurality of spring links for supporting said feeder trough from said hopper in suspended relation with respect thereto, a motor supported by said trough rearwardly of the rear end thereof, a transverse shaft journaled beneath said trough and carried thereby and extending beyond opposite sides thereof, a flywheel on each end of said shaft, a flexible belt for driving said flywheels and shaft from said motor, and means for unbalancing the weights of said flywheels and selectively operable to vary the amplitude of vibration of said trough.

2. In a vibrating feeder and in combination with a hopper therefor, a chute extending along each side of said hopper, a gate between the walls of said chute at the forward end of said hopper and pivotally mounted for movement between the walls of said chute, an inclined feeder trough extending upwardly along the outer sides of the walls of said chute, spring link means yieldably suspending said feeder trough from said hopper, a transverse shaft journaled beneath said trough adjacent the rear end thereof and extending beyond opposite sides thereof, a motor supported on said trough rearwardly of the rear end thereof, flywheels on said shaft and extending along the outer side of said trough, a flexible drive connection from said motor to said flywheels, means on said gate for varying the weight thereof and the flow of material from said chute, and means on said flywheels for unbalancing the weight thereof in accordance with the desired amplitude of vibration of said trough.

3. In a vibratory feeder and in combination with a hopper therefor, a chute extending along the discharge end of said hopper and having a gate pivotally mounted therebetween forwardly of the forward end of the said hopper for restricting the flow of material from said hopper, an inclined feeder trough extending upwardly along each side of said chute and beyond the ends thereof, a plurality of spring links suspending said feeder trough from said hopper, a platform extending rearwardly from said feeder trough, a motor mounted on said platform, a transverse shaft rotatably carried by said platform beneath said feeder trough forwardly of the rear end thereof and extending beyond opposite sides of said feeder trough, a flywheel on each end of said shaft, a flexible drive connection from said motor to one of said flywheels, for driving said shaft and said flywheels, separate weights for unbalancing each flywheel, means on each flywheel for carrying said weights, said weights being replaceable for varying the amplitude of vibration of said trough and the intensity of the conveying action thereof, pins extending forwardly from said gate adjacent the lower end thereof, and weight means detachably carried by said pins for varying the flow of material from said chute and along said trough.

4. In a vibratory feeder, a hopper for loose material having a converging discharge end portion, means for supporting said hopper in vertically spaced relation with respect to the ground, a chute extending along the discharge end of said hopper, means on said chute for controlling the flow of loose material to said hopper, an inclined feeder trough extending along said chute and upwardly along the side walls thereof and beyond the discharge end thereof, a plurality of spring links yieldably suspending the rear end of said feeder trough from said hopper, a plurality of spring links yieldably suspending the forward end of said feeder trough from said hopper, means for adjusting the length of said last mentioned spring links and varying the angle of said feeder trough, a frame structure extending rearwardly of the rear end of said feeder trough, a motor mounted on said frame structure, a shaft rotatably supported on said frame structure beneath the bottom thereof, a flywheel on each end of said shaft, a belt for driving said shaft and flywheels from said motor, unbalancing weight carrying means on said flywheel, and replaceable weights carried by said weight carying means for unbalancing said flywheels and varying the amplitude of vibration thereof and the flow of material therealong.

References Cited in the file of this patent

UNITED STATES PATENTS

| | | |
|---|---|---|
| 528,077 | Combs | Oct. 23, 1894 |
| 631,485 | Cornwall | Aug. 22, 1899 |
| 1,188,323 | Richardson | June 20, 1916 |
| 1,200,866 | Ramsay | Oct. 10, 1916 |
| 1,868,404 | Zeigler | July 19, 1932 |
| 2,144,382 | Lincoln et al. | Jan. 17, 1939 |
| 2,539,070 | Gebo | Jan. 23, 1951 |
| 2,696,905 | Rigali | Dec. 14, 1954 |

FOREIGN PATENTS

| | | |
|---|---|---|
| 242,277 | Great Britain | Apr. 29, 1926 |